US008713129B2

(12) United States Patent
Schneider

(10) Patent No.: US 8,713,129 B2
(45) Date of Patent: Apr. 29, 2014

(54) THWARTING KEYLOGGERS USING PROXIES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 849 days.

(21) Appl. No.: 12/394,586

(22) Filed: Feb. 27, 2009

(65) Prior Publication Data

US 2010/0223358 A1 Sep. 2, 2010

(51) Int. Cl.
*G06F 15/16* (2006.01)
(52) U.S. Cl.
USPC ............ 709/217; 709/203; 709/227; 709/229
(58) Field of Classification Search
USPC .................................. 709/203, 217, 227, 229
See application file for complete search history.

(56) References Cited

U.S. PATENT DOCUMENTS

| 7,705,829 B1* | 4/2010 | Plotnikov ...................... 345/168 |
| 2004/0133630 A1* | 7/2004 | Coles et al. ................... 709/202 |
| 2005/0021668 A1* | 1/2005 | Beesley et al. ................ 709/217 |
| 2009/0063850 A1* | 3/2009 | Joram et al. ................... 713/155 |
| 2009/0100129 A1* | 4/2009 | Vigil et al. ..................... 709/203 |
| 2009/0199294 A1* | 8/2009 | Schneider ....................... 726/18 |

OTHER PUBLICATIONS

Herley, Cormac et al., "How to Login From an Internet Café Without Worrying About Keyloggers," Symposium on Usable Privacy and Security, SOUPS '06, Jul. 2006, 2 pages.
Florencio, Dinei et al., "KLASSP: Entering Passwords on a Spyware Infected Machine Using a Shared-Secret Proxy," Computer Security Applications Conference, 2006, ACSAC '06, 22$^{nd}$ Annual, Dec. 2006, pp. 67-76.

* cited by examiner

*Primary Examiner* — Phuoc Nguyen
(74) *Attorney, Agent, or Firm* — Lowenstein Sandler LLP

(57) ABSTRACT

Techniques for thwarting keylogger using a proxy are described herein. According to one embodiment, in response to a request received from a client for accessing a Web page provided from a remote Web server over a network, a proxy server retrieves the Web page from the remote Web server and presents the Web page to the client. The proxy server further presents a virtual keyboard to the client to allow a user of the client to enter one or more keys in an input field of the Web page without having to type at the client for the purposes of logging into the Web site. Thereafter, the proxy server directs traffic between the client and the remote Web server over the network. Other methods and apparatuses are also described.

18 Claims, 6 Drawing Sheets

| URL | ... | ... |
| Username | ... | ... |
| Password | ... | ... |

THWARTING KEYLOGGERS USING PROXIES

TECHNICAL FIELD

The present invention relates generally to a secure communication system. More particularly, this invention relates to methods to thwart a keylogger using a proxy.

BACKGROUND

As the Internet and its underlying technologies have become increasingly familiar, attention has become focused on Internet security and computer network security in general. With unprecedented access to information have also come unprecedented opportunities to gain unauthorized access to data, change data, destroy data, make unauthorized use of computer resources, interfere with the intended use of computer resources, etc. These opportunities have been exploited time and time again by many types of malware including, but not limited to computer viruses, worms, Trojan horses, etc.

Recently, some new types of software have emerged, collectively called "spyware." Spyware, while not as malicious as the aforementioned conventional viruses, Trojan horses, etc., may still cause problems for computer users. For example, spyware may be designed to log keystrokes, track which websites a computer user visits, and/or transmit personal information to a third party.

Keylogging is one of the most insidious threats to a user's personal information. Passwords, credit card numbers, and other sensitive or personally identifying information are potentially exposed. Efforts have been made to counter such a threat. One approach is to require a user to enter random keystrokes between entering actual keystrokes of a password or username in order to frustrate the keylogger. However, this method requires extensive user training and intervention.

Several websites offer the possibility of using an on-screen virtual keyboard that lets a user enter a password by clicking buttons on a screen. These schemes offer variable increments of security based on how they are implemented, but even the simplest ones bypass the majority of keystroke loggers. However, not all Web sites offer such a feature.

BRIEF DESCRIPTION OF THE DRAWINGS

The present invention is illustrated by way of example and not limitation in the figures of the accompanying drawings in which like references indicate similar elements.

FIG. 3 is a block diagram illustrating a data structure for storing confidential information according to one embodiment of the invention.

DETAILED DESCRIPTION

Techniques for thwarting a keylogger using a proxy are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, a service is proposed where people can use a virtual on-screen keyboard in a proxy server to access an account of another Web site. Such a proxy server can either be a straight proxy situation, or the proxy that could cache a set of credentials for the user, such that the user does not have to enter sensitive credentials on a client machine (e.g., the suspect machine).

Such a service could be operated by letting a user enter Web addresses, usernames, and passwords, possibly saving them in association with a nickname (for example, a user could have "Primary checking account", "Wife's checking account", "Mastercard", etc., and never directly identify the accounts in question). Then, when the user needs to access one of these accounts, the user can go to the proxy service Web site and log in to its account using the virtual on-screen keyboard. Once the user logs in, the user is provided a list of accounts the user can interact with (such as a list of hyperlinks for their set-up accounts). The user clicks on one of their accounts, and the proxy service acts as an intermediary, handling the account login for the user.

As a result, the user does not have to type in any key on the client machine and the keylogger cannot capture the confidential information that the user enters in order to log into a destination Web site (e.g., user's bank Web site). In addition, a user can use a proxy server to access any selected Web site, even though the selected Web site does not offer an on-screen keyboard (also referred to as an obscured input interface or mechanism).

Figure 1:
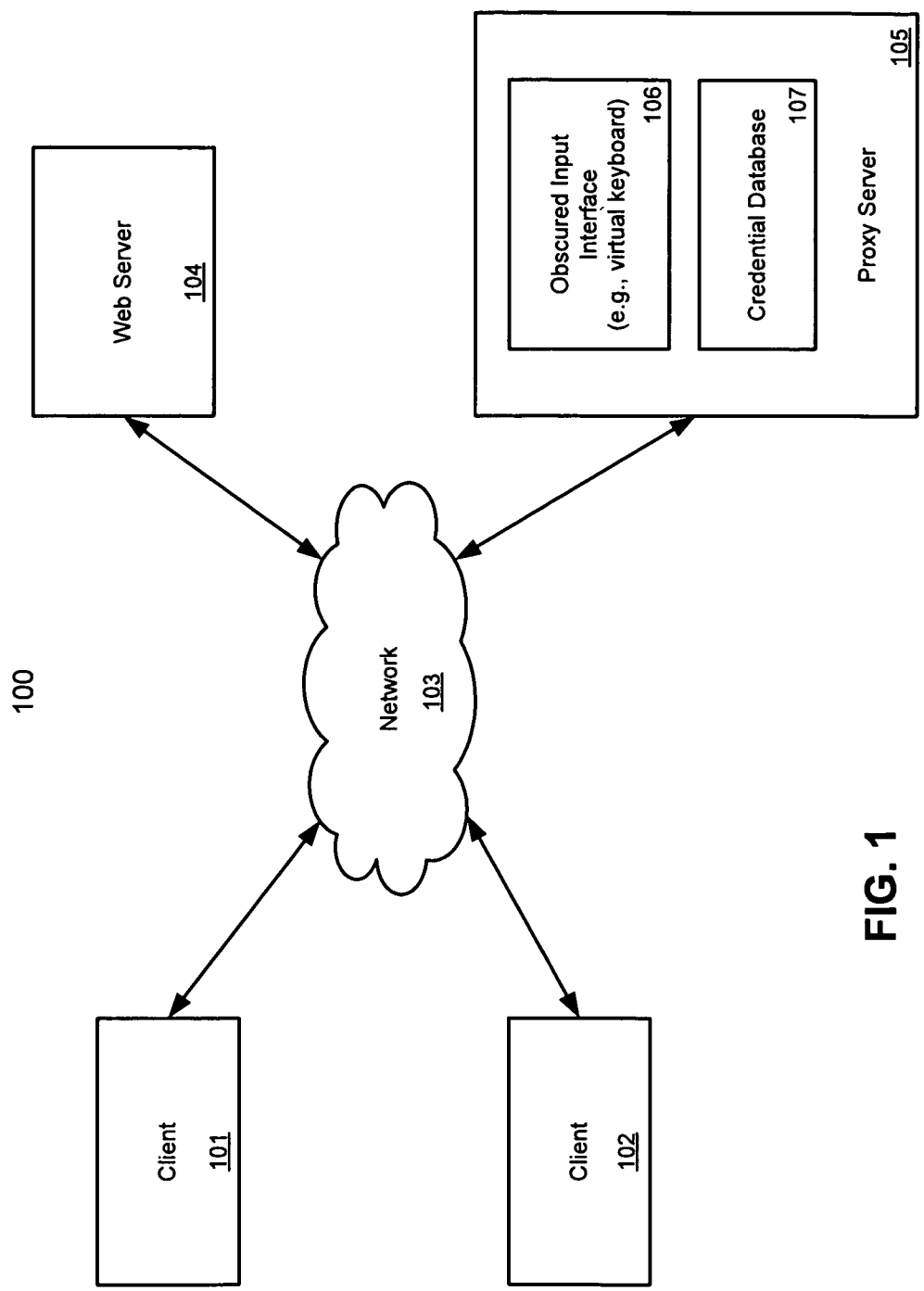
FIG. 1 is a block diagram illustrating an example of a network configuration according to one embodiment of the invention.

FIG. 1 is a block diagram illustrating an example of a network configuration according to one embodiment of the invention. Referring to FIG. 1, according to one embodiment, network configuration 100 includes one or more clients 101-102 communicatively coupled to a server 104 over a network 103. Clients 101-102 may be any kind of client machine such as a personal computer (PC) either as a desktop or a portable computer. For example, clients 101-102 may be computers available in a public domain, such as those available in a public library or a cyber café, etc. In these environments, it is very common that a spyware such as keylogger may be installed in the system. Web server 104 may be any Web server that provides content or services to users. For example, Web server 104 may be part of a Web site of a financial institute. Network 103 may be a wide area network (WAN) such as the Internet, a local area network, or a combination of both.

In addition, network configuration 100 further includes a proxy server 105 that can be hosted by a computing device such as a server computer. Proxy server 105 provides proxy services between clients 101-102 and Web server 104. That is, the traffic between any of clients 101-102 may have to go through proxy server 105 in order to access Web server 104. According to one embodiment, proxy server 105 includes an obscured input interface 106 that allows a user to enter confidential information such as a username or password without having to type at a client machine such as clients 101-102. As a result, a keylogger installed on a client machine is not able to capture what the user enters on the obscured input interface.

An obscured input interface may be an on-screen keyboard, also referred to as a virtual keyboard. A virtual keyboard is in a form of graphical user interface having graphical buttons simulating keys of a conventional keyboard. A user can "enter" a key by clicking using a pointing device or via a touch screen interface a corresponding graphical button on the screen and application software can in turn interpret which key has been pressed. In this situation, a keylogger cannot capture what keys a user has entered. At most, what the keylogger can capture is a stream of mouse clicks. In one embodiment, the keys of a virtual keyboard may be presented in a random arrangement which may be different every time the user "enters" a key.

For example, when a user of client 101 desires to access Web server 104, in this example, a bank Web site to log into a user's bank account, instead of directly accessing server 104, the user accesses proxy server 105. Prior to accessing proxy server 105, the user may have to establish a user account in proxy server 105. The user may long into its account on proxy server 105 using an on-screen keyboard 106 without typing at client 101. Once the user logs into proxy server 105, the user can direct the proxy server to access server 104. The proxy server 105 retrieves a Web page, in this example, a login page, from server 104. Once the login page is loaded, the user can use virtual keyboard 106 again to enter the user's username and/or password, etc. In this configuration, proxy server 105 serves as a straight proxy directing traffic between client 101 and server 104 and provides a virtual keyboard to allow a user to enter confidential information without typing.

Note that the virtual keyboard 106 may be utilized based on user's discretion. A user may decide to use virtual keyboard 106 only when there is a need to enter confidential information on a Web page. Otherwise, the user may use a conventional keyboard of client 101. Thus, proxy server 105 and/or virtual keyboard 106 may be provided to client 101 as a service hosted by an organization, which may be an independent or third-party entity.

Figure 3:
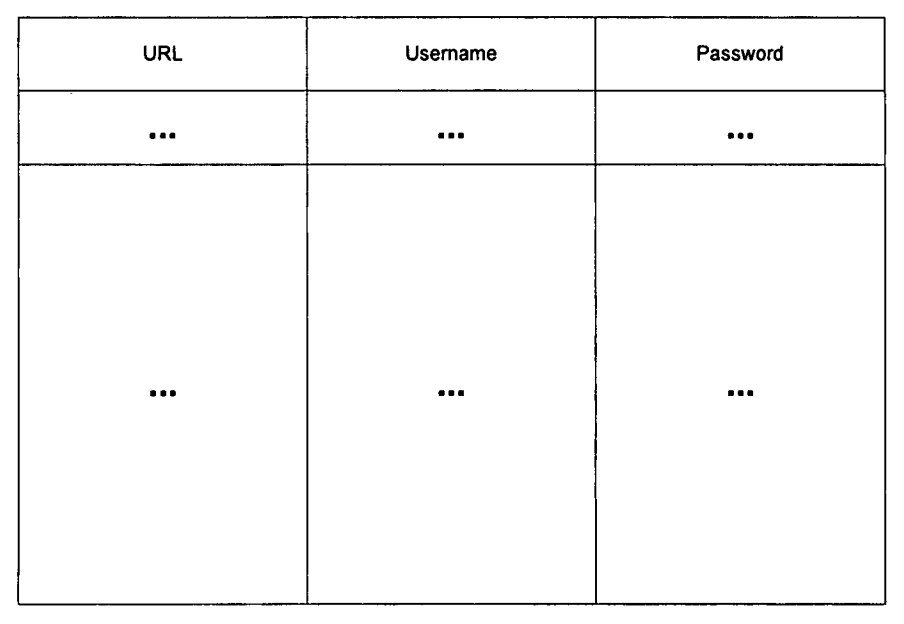

According to a further embodiment, proxy server 105 includes a database 107 to store a set of confidential information or credentials (e.g., username or password) that are required to be entered in an input field of a login page of server 104. After a user logs into proxy server 105, for example, using virtual keyboard 106, the user can select a Web site (e.g., a URL or universal resource locator) from database to retrieve a login page. Once the login page is retrieved, the user can "enter" a username and/or password by selecting the corresponding username and/or password associated with the selected Web site from database 107. An example of a data structure representing database 107 is shown in FIG. 3. As a result, the user does not even have to use a virtual keyboard when "entering" the confidential information.

Note that in order to implement the above system, a service provider of proxy server 105 has to be a trustworthy vendor having necessary security that would not expose the confidential information stored in database 107. In order to invoke services provided by proxy server 105, a user may have to subscribe the service and register with proxy server 105. For example, a user may have to provide information as shown in FIG. 3 when registering with the proxy server 105 (e.g., a list of bank accounts, etc.), such that the user can subsequently "enter" the confidential information on a Web page by selecting from database 107 of proxy server 105. Other configurations may also exist.

Also note that throughout this application, a login page has been used as an example where a user can use the techniques described herein to enter confidential information. It is not so limited, the techniques described herein can also be applied to any page in which a user is required to enter confidential information.

Figure 2:
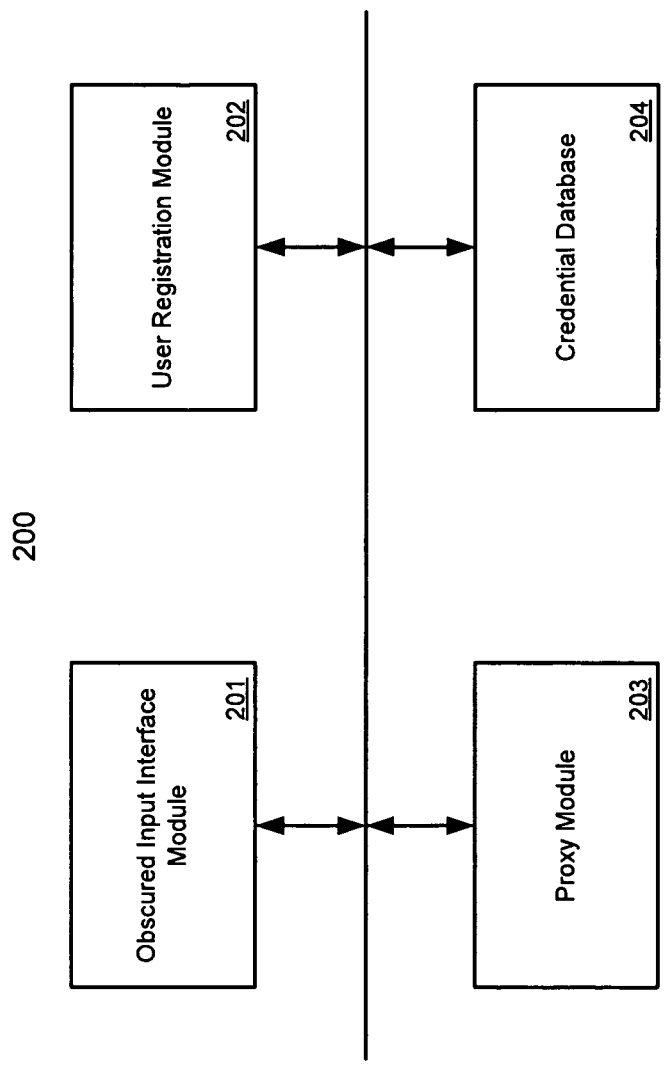
FIG. 2 is a block diagram illustrating an example of a proxy server according to one embodiment.

FIG. 2 is a block diagram illustrating an example of a proxy server according to one embodiment. For example, system 200 may be implemented as part of proxy server 105 of FIG. 1. Referring to FIG. 2, system 200 includes an obscured input interface module 201, a user registration module 202, a proxy module 203, and a credential database 204. Obscured input interface module 201 is responsible for providing an obscured keyboard such as a virtual keyboard to a user. Module 201 is further configured to interpret or map the user interaction with the virtual keyboard to a corresponding key signal representing an actual corresponding key of a conventional keyboard. User registration module 202 is responsible for registering a user and stores a list of Web sites as well as the associated confidential information required to log into the Web sites in database 204.

Proxy module 203 is responsible for directing traffic between a remote client (e.g., client 101) and a destination Web site (e.g., Web server 104). For example, proxy module 203 serves as a server to client 101 while serving as a client to Web server 104. In response to a request received from a client 101, proxy module 203 repackages the request and sends the request to server 104. After a response has been received from server 104, the proxy module 203 repackages the response and sends the response back to the client 101. Note that some or all of the modules as shown in FIG. 2 may be implemented in software, hardware, or a combination of both software and hardware. Other components may also be included.

Figure 4:
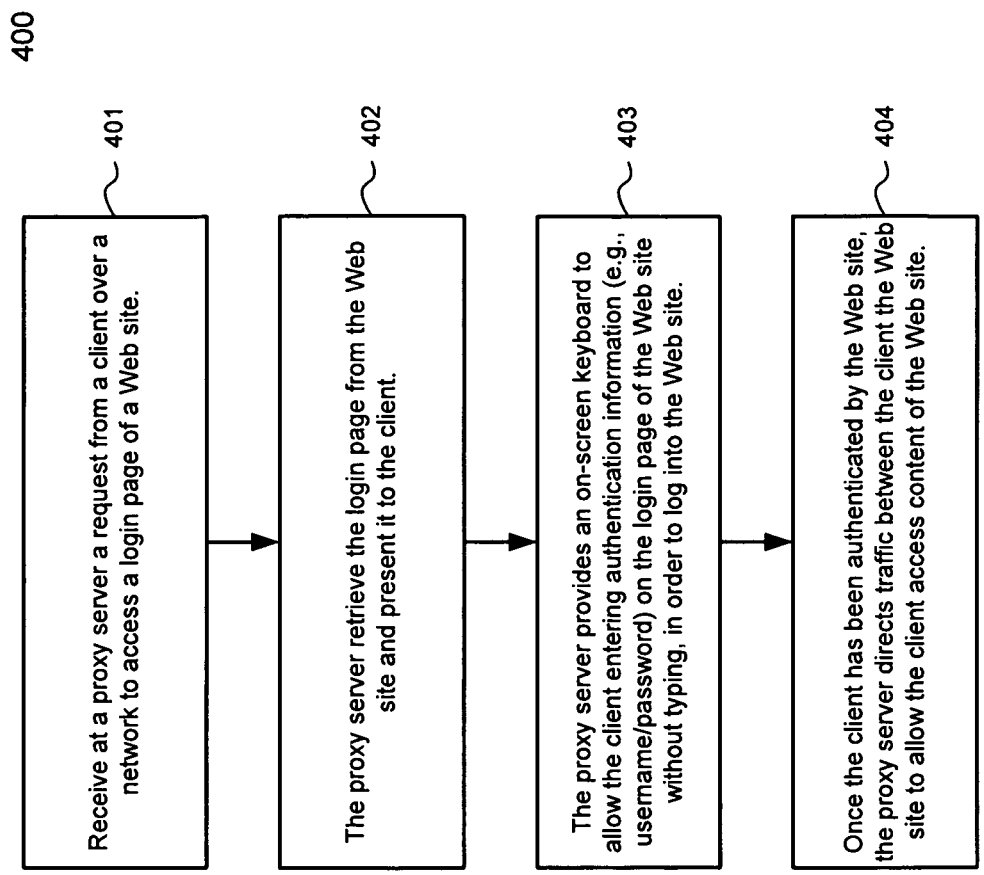
FIG. 4 is a flow diagram illustrating an example of a method for thwarting keyloggers according to one embodiment of the invention.

FIG. 4 is a flow diagram illustrating an example of a method for thwarting keyloggers according to one embodiment of the invention. Note that method 400 may be performed by processing logic which may include hardware, software, or a combination of both. For example, method 400 may be performed by proxy server 200 of FIG. 2. In this example, the proxy server serves as a straight proxy. Referring to FIG. 4, at block 401, a proxy server receives a request from a client for accessing a Web page (e.g., a login page) of a remote Web site. In response to the request, the proxy server retrieves the requested login page from the remote Web site and presents the Web page to the client. At block 403, the proxy server provides an on-screen keyboard to allow the user to "enter" confidential information (e.g., username or password) on the login page without typing at the client machine. Once the user has been authenticated by the remote Web sire, at block 404, proxy server directs traffic between the client and the remote Web site to allow the client to access content of the remote Web site.

Figure 5:
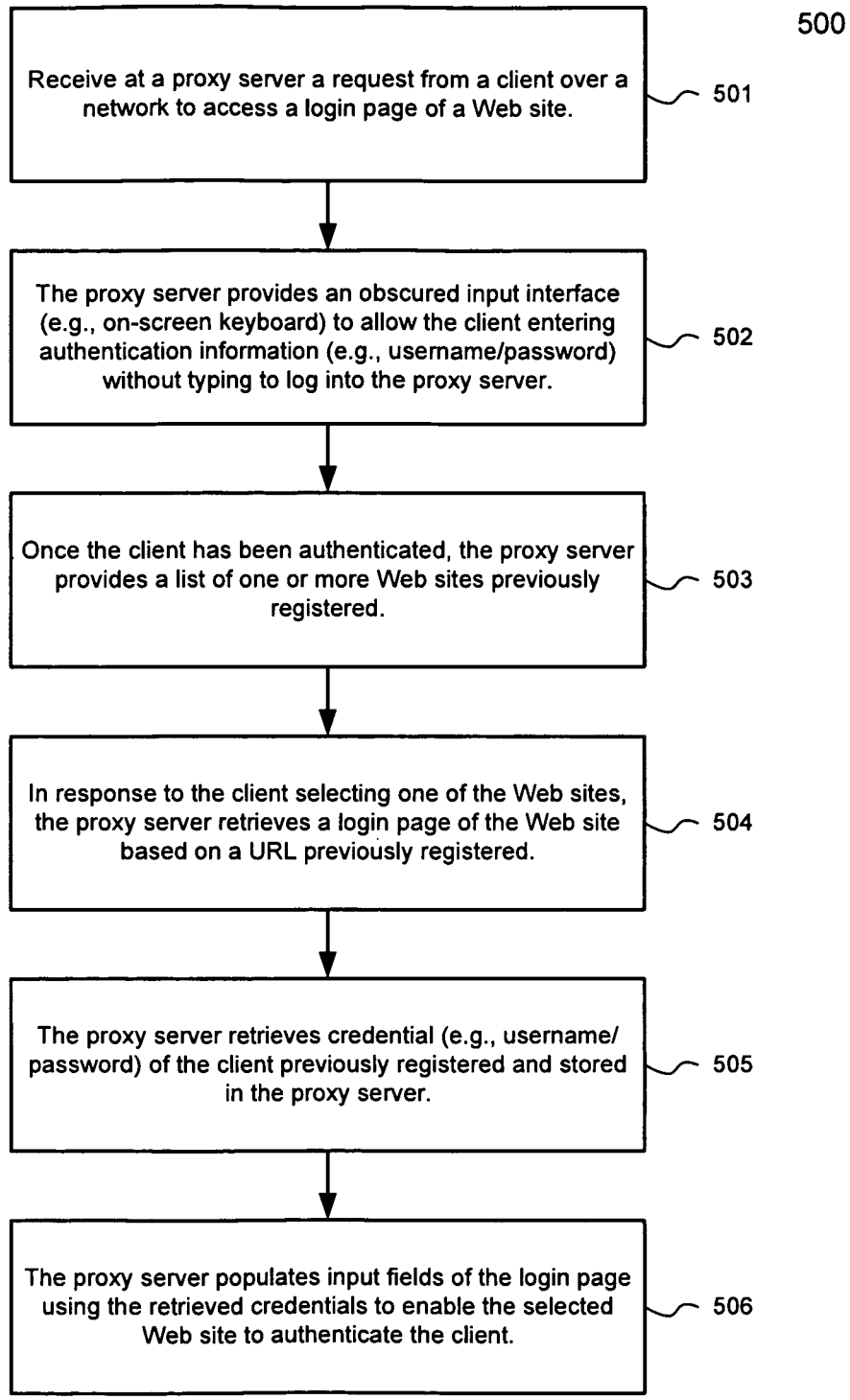
FIG. 5 is a flow diagram illustrating an example of a method for thwarting keyloggers according to another embodiment of the invention.

FIG. 5 is a flow diagram illustrating an example of a method for thwarting keyloggers according to another embodiment of the invention. Note that method 500 may be performed by processing logic which may include hardware, software, or a combination of both. For example, method 500 may be performed by proxy server 200 of FIG. 2. In this example, the proxy server serves as a proxy that caches confidential information within the proxy. Referring to FIG. 5, at block 501, a proxy server receives a request from a client to access a Web page (e.g., a login page) of a remote Web site. In response to the request, at block 502, the proxy server presents an obscured input interface, such as an on-screen keyboard, to the client to allow the client to "enter" without typing the confidential information (e.g., username or password) in order to log into the proxy server. Once the client logs into the proxy server, at block 503, the proxy server provides a list of Web sites that have been previously registered by the client. In response to the client selecting one of the Web sites from the list, at block 504, the proxy server retrieves the Web page of the selected Web site, for example, based on a URL (universal resource locator) stored within the proxy server. At block 505, the proxy server retrieves confidential information or credentials (e.g., username and/or password) required for log into the Web page of the selected Web site, which are previously stored in the proxy during registration. At block 506, the proxy server populates input fields of the Web page using the retrieved credentials to enable the selected Web site to authenticate the client for the purposes of logging into the selected Web site. As a result, the user does not have to "enter" the necessary confidential information on the Web page. Other operations may also be performed.

Figure 6:
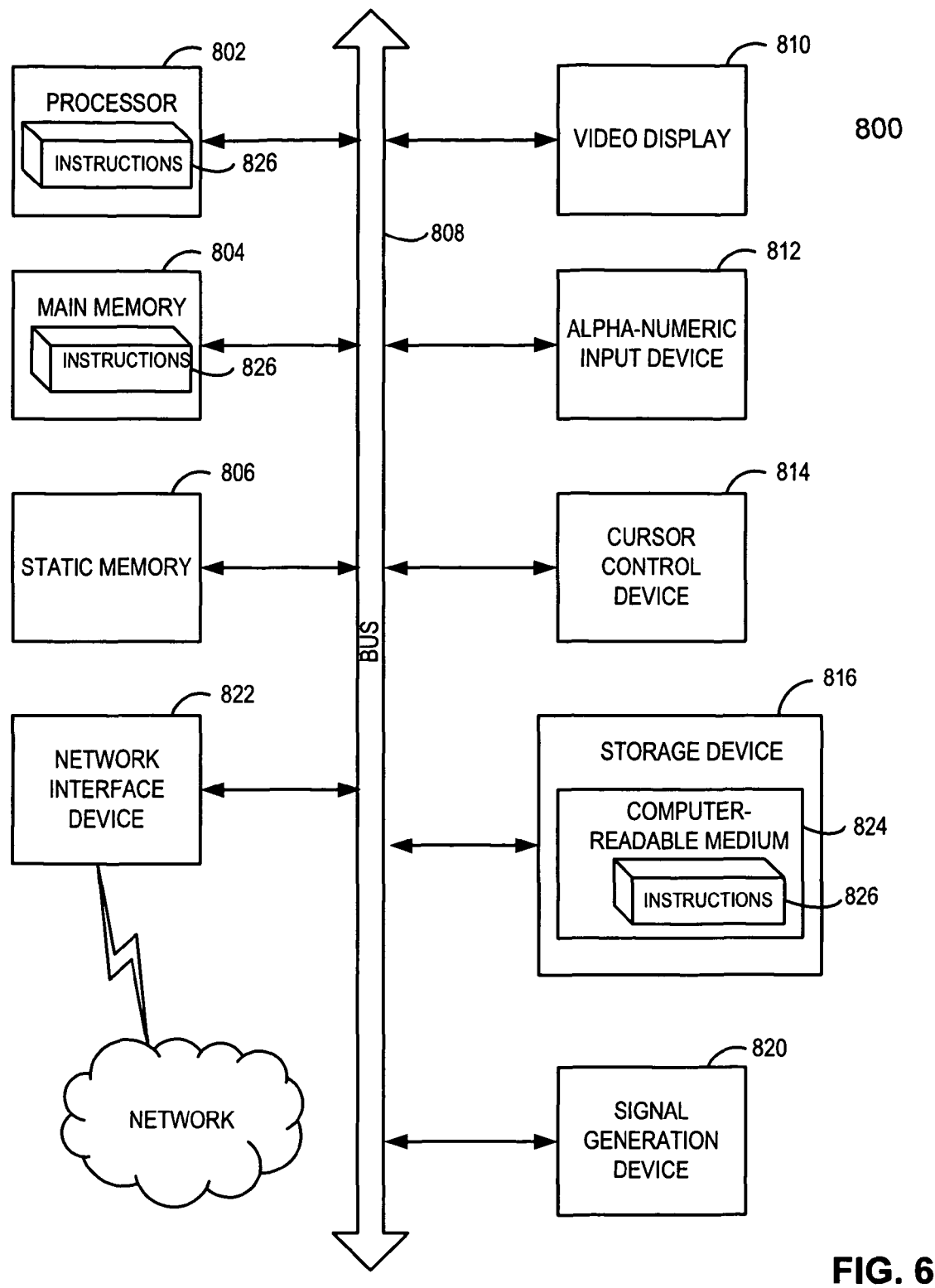
FIG. 6 illustrates a diagrammatic representation of a machine which may be used with an embodiment of the invention.

FIG. 6 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software 826 embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network via the network interface device 822.

Thus, techniques for thwarting keylogger using a proxy have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   retrieving a Web page from a remote Web server and presenting the Web page to a client, in response to a request received at a proxy server from the client for accessing the Web page provided from the remote Web server;
   prior to retrieving the Web page, causing, by the proxy server, a virtual keyboard to be presented on the client to allow a user of the client to log into the proxy server without having to type at the client;
   after the user is logged into the proxy server, causing, by the proxy server, a list of accounts to be presented on the client to allow a user of the client to select one of the accounts on the list, wherein the proxy server receives the request from the client in response to the user's selection of the one account from the list;
   causing, by the proxy server, one or more keys in an input field of the Web page to be entered without the user having to type at the client;
   intercepting, by the proxy server, traffic between the client and the remote Web server over the network; and
   wherein the Web server does not offer an on-screen keyboard, and wherein the one or more keys can be entered in the input field of the Web page without the user having to type at the client when the Web server does not offer the on-screen keyboard.

2. The method of claim 1, wherein the Web page is a login page of the Web server, and wherein the one or more keys entered in the input field represent confidential information to allow the Web server to authenticate the client in order to log into the Web server.

3. The method of claim 2, further comprising:
   retrieving the confidential information from a storage associated with the proxy server, the confidential information including at least a password in order to enter the Web server; and
   populating the confidential information in the input field without requiring the user to enter the confidential information in the input field using the virtual keyboard.

4. The method of claim 3, wherein the confidential information is previously registered with the proxy server and stored in a storage area of the proxy server specifically allocated to the user.

5. The method of claim 4, wherein the confidential information is stored in a database having a plurality of entries, each entry having a URL (universal resource locator) of a Web site and confidential information required to log into the Web site.

6. The method of claim 1, wherein the virtual keyboard is presented as a graphical user interface having a plurality of graphical buttons simulating at least a portion of keys of a conventional keyboard, and wherein a graphical button is activated via a click action from a pointing device at the client.

7. The method of claim 6, wherein the graphical buttons are displayed and arranged in a random manner different than key arrangements of the conventional keyboard.

8. The method of claim 1, wherein the list of accounts is presented as a list of account identifiers that do not directly identify the accounts.

9. The method of claim 1, wherein the list of accounts is presented as a list of hyperlinks.

10. A non-transitory computer-readable storage medium storing instructions which when executed by a machine, cause the machine to perform a method, the method comprising:
    retrieving a Web page from a remote Web server and presenting the Web page to a client, in response to a request received at a proxy server from the client for accessing the Web page provided from the remote Web server;
    prior to retrieving the Web page, causing, by the proxy server, a virtual keyboard to be presented on the client to allow a user of the client to log into the proxy server without having to type at the client;
    after the user is logged into the proxy server, causing, by the proxy server, a list of accounts to be presented on the client to allow a user of the client to select one of the accounts on the list, wherein the proxy server receives the request from the client in response to the user's selection of the one account from the list;
    causing, by the proxy server, one or more keys in an input field of the Web page to be entered without the user having to type at the client;
    intercepting, by the proxy server, traffic between the client and the remote Web server over the network; and
    wherein the Web server does not offer an on-screen keyboard, and wherein the one or more keys can be entered in the input field of the Web page without the user having to type at the client when the Web server does not offer the on-screen keyboard.

11. The non-transitory computer-readable storage medium of claim 10, wherein the Web page is a login page of the Web server, and wherein the one or more keys entered in the input field represent confidential information to allow the Web server to authenticate the client in order to log into the Web server.

12. The non-transitory computer-readable storage medium of claim 11, wherein the method further comprises:
    retrieving the confidential information from a storage associated with the proxy server, the confidential information including at least a password in order to enter the Web server; and
    populating the confidential information in the input field without requiring the user to enter the confidential information in the input field using the virtual keyboard.

13. The non-transitory computer-readable storage medium of claim 12, wherein the confidential information is previously registered with the proxy server and stored in a storage area of the proxy server specifically allocated to the user.

14. The non-transitory computer-readable storage medium of claim 13, wherein the confidential information is stored in a database having a plurality of entries, each entry having a URL (universal resource locator) of a Web site and confidential information required to log into the Web site.

15. The non-transitory computer-readable storage medium of claim 10, wherein the virtual keyboard is presented as a graphical user interface having a plurality of graphical buttons simulating at least a portion of keys of a conventional keyboard, and wherein a graphical button is activated via a click action from a pointing device at the client.

16. The non-transitory computer-readable storage medium of claim 15, wherein the graphical buttons are displayed and arranged in a random manner different than key arrangements of the conventional keyboard.

17. A proxy server, comprising:
a processor;
a memory coupled to the processor;
a proxy module executed in the memory by the processor to retrieve a Web page from a remote Web server and to present the Web page to a client over a network, in response to a request received from the client for accessing the Web page provided from the remote Web server;
an obscured input interface module to present, prior to retrieving the Web page, a virtual keyboard to the client to allow a user of the client to log into the proxy server without having to type at the client, wherein the proxy module is configured to intercept traffic between the client and the remote Web server over the network, and wherein the proxy module is configured to present a list of accounts on the client to allow a user of the client to select one of the accounts on the list after the user is logged into the proxy server, wherein the proxy module is configured to receive the request from the client in response to the user's selection of the one account from the list, wherein the proxy module is configured to enter one or more keys in an input field of the Web page without the user having to type at the client; and wherein the Web server does not offer an on-screen keyboard, and wherein the one or more keys can be entered in the input field of the Web page without the user having to type at the client when the Web server does not offer the on-screen keyboard.

18. The proxy server of claim 17, further comprising:
a credential database to store confidential information, wherein the confidential information is populated into the input field without typing from the user; and
a registration module to allow the user to register a URL (universal resource locator) of the Web site and the confidential information required to log into the Web site to be stored in the database.

* * * * *